Figure 1:
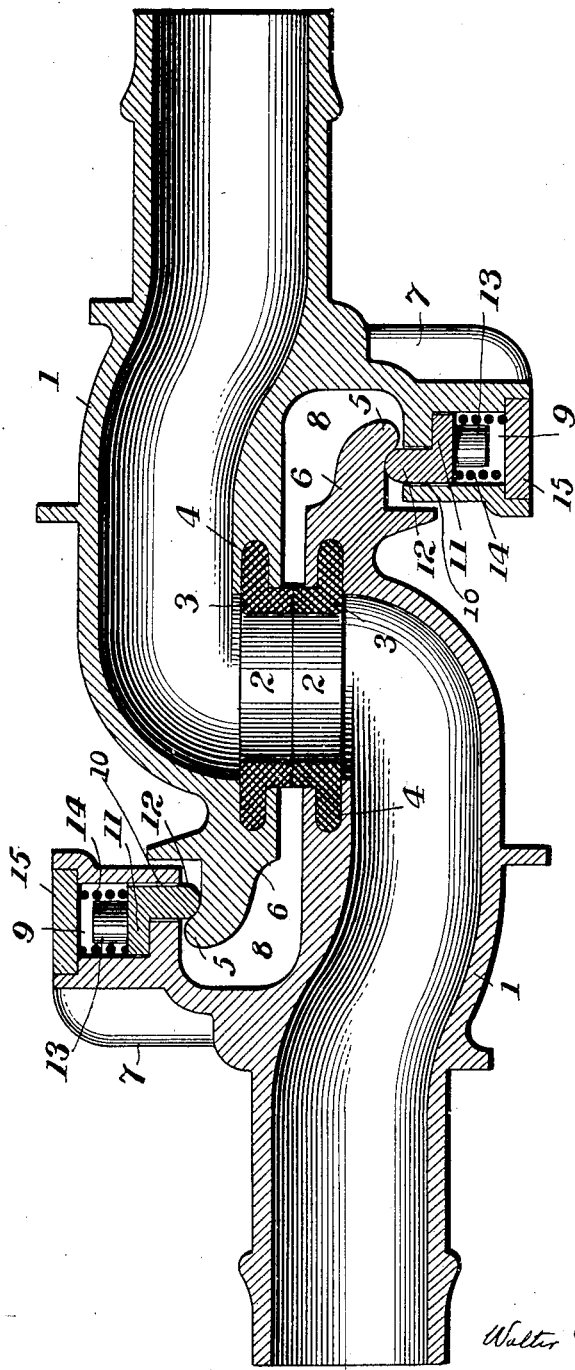

No. 882,503. PATENTED MAR. 17, 1908.
W. W. KILPATRICK.
AIR HOSE COUPLING.
APPLICATION FILED OCT. 30, 1907.

2 SHEETS—SHEET 1.

Witnesses
J. G. Hinkel
J. J. McCarthy

Inventor
Walter W. Kilpatrick

By
Foster, Freeman, Watson & Cait
Attorneys

No. 882,503. PATENTED MAR. 17, 1908.
W. W. KILPATRICK.
AIR HOSE COUPLING.
APPLICATION FILED OCT. 30, 1907.
2 SHEETS—SHEET 2.
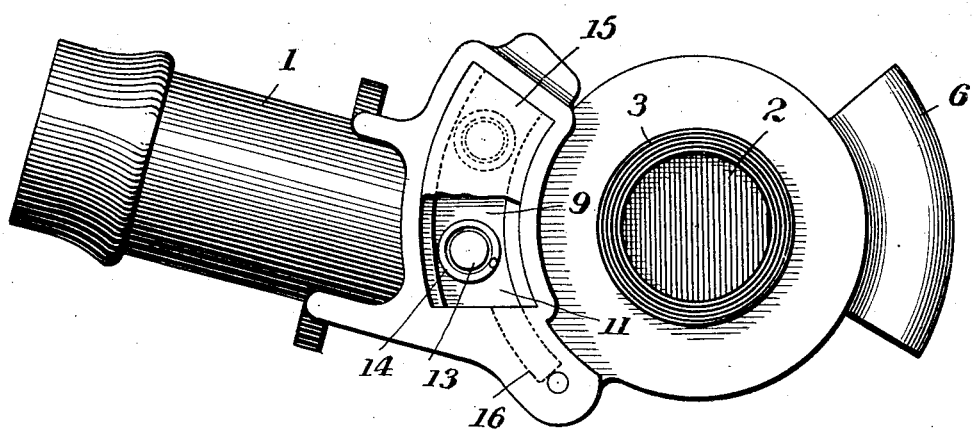
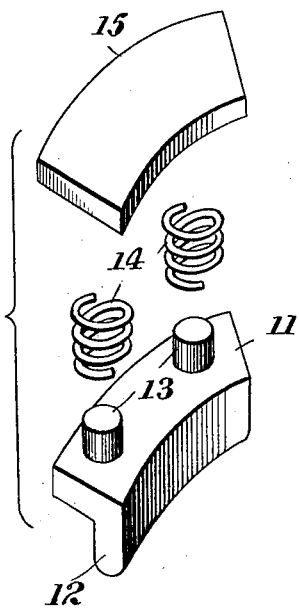

UNITED STATES PATENT OFFICE.

WALTER W. KILPATRICK, OF ATLANTA, GEORGIA, ASSIGNOR TO AIR-BRAKE AND STEAM-HEAT CONNECTION COMPANY, OF ATLANTA, GEORGIA.

AIR-HOSE COUPLING.

No. 882,503.

Specification of Letters Patent.  Patented March 17, 1908.

Application filed October 30, 1907. Serial No. 399,876.

*To all whom it may concern:*

Be it known that I, WALTER W. KILPATRICK, a citizen of the United States, residing at Atlanta, in the county of Fulton, State of Georgia, have invented certain new and useful Improvements in Air-Hose Couplings, of which the following is a specification.

This invention relates to hose couplings and is particularly adapted for use as the means for connecting the ends of the air pipes used in trains.

It relates to that particular class of couplings which embody two duplicate heads having lateral communicating openings and in which each head is provided with semi-circular interlocking ribs formed concentric with the opening, and in which the two heads are joined by simply placing the lateral openings in alinement and rotating the two heads in opposite directions in a vertical plane. In this class of couplings used between cars the two heads are elevated, brought together and allowed to descend in contact, thus giving them a relative rotation and interlocking them. To unlock the heads it is simply necessary to elevate them sufficiently, but it has been found in practice that the ordinary brakeman will not always raise the coupling sufficiently to unlock the heads when the cars are uncoupled and the consequence is that the separation of the cars, while the heads are interlocked, breaks the hose connection and throws the system out of operative condition.

The object of my invention is to provide means for positively locking the heads together when they are in normal position, and also means whereby the heads may separate when subjected to undue longitudinal strain such as that which occurs when the two cars which are connected by the coupling separate. It will be understood that the coupling heads in this class of devices normally hang below the horizontal line of the hose connection, and that when the cars separate the longitudinal strain on the hose connection straightens it and elevates the interlocking heads. This elevation gives the two heads a partial rotation tending to unlock them, and in my improved device the structure is such that when this partial rotation occurs the heads are in condition to automatically separate when subjected to undue longitudinal strain without injuring in any way the head or the hose connection.

In the accompanying drawings: Figure 1 is a horizontal section through two interlocked coupling heads embodying my invention; Fig. 2 is a side view of one of the heads partly broken away; and Fig. 3 is a detailed perspective view of parts of the automatic interlocking mechanism.

As shown in the drawings, the duplicate heads 1 are provided with lateral communicating openings 2 having the packing ring 3 mounted in the circumferential grooves 4. I prefer to make the heads of brass, and the packing rings may be made of brass or any suitable packing material. Each head is provided with the semi-circular rib 5 which is formed on a projecting flange 6 on one side of the opening 2 and concentric therewith. On the other side of the opening there is an angular arm 7 which leaves a socket 8 between its outer end and the main wall of the head in which the flange 6 of the opposite head is adapted to fit. This arm 7 at its outer end is made hollow, leaving a chamber 9 having a slot 10 in its inner wall facing the main portion of the head, and this slot is made semi-circular and concentric with the openings 2. Within the chamber 9 is an angular piece 11 which is slidably mounted and which has a flange 12 with a rounded outer margin projecting through the slot 10 and forming a rib adapted to coöperate with the rib 5 of the opposite head. Near the ends of the piece 11 are placed pins 13 surrounded by coil springs 14 which bear against the plate 15 which serves as a closure for the chamber 9. It will be noted that the rib formed by the projecting piece 12 may be depressed by pressure thereon and that by reason of its rounded shape and the rounded shape of the rib 5 a longitudinal pull of the rib 5 across this adjustable rib will depress it and allow the parts to separate. On the arms 7 and as a continuation of the adjustable rib there is shown a rib 16 made integral with the arm 7 and serving as a positive interlocking means between the rib 5 and the arm 7. The length of the rigid rib 16 and the relative length of the adjustable spring pressed continuation of that rib are to be determined from the particular conditions under which the device is used.

It will be noted that in operation the two coupling heads above described are united in the usual way by bringing the lateral openings into alinement and rotating the heads in opposite directions, and the ribs interlock in the usual way. Since however the upper part of one rib of each interlocking pair is held in place simply by spring pressure, the two heads may be made to separate by longitudinal pull at any point in the rotation above that at which the rib 5 reaches and engages the rigid rib 16. This rigid rib 16 will be engaged when the heads are in normal position hanging down by their own weight, thus securely holding the parts together without any possibility of accidental disengagement. If however the cars are uncoupled and by their separation a strain is put upon the connecting hose pipes, the two heads are elevated thus rotating them sufficiently to disengage the rigid rib 16 from the rib 5 and leaving only the engagement between the rib 5 and the adjustable rib 12. This device therefore has different functions and advantages from one in which the ribs are made rigid throughout, and also from one in which the ribs are made spring pressed throughout.

Having thus described my invention, what I claim and desire to secure by Letters Patent, is:—

1. The combination in a pipe coupling of two coupling heads, means for interlocking said heads by rotating them in contact in opposite directions, means for retaining them yieldingly locked after a partial rotation, and means for retaining them rigidly locked after a further rotation.

2. The combination in a pipe coupling of two duplicate heads having lateral communicating openings, means for interlocking said heads against endwise separation by rotating them in opposite directions, means for retaining them rigidly locked when they have been rotated a certain distance, and means for retaining them yieldingly locked when they have been rotated a less distance.

3. The combination in a pipe coupling of two duplicate heads having lateral communicating openings, curved interlocking ribs carried by said heads, the said ribs being upon opposite sides of the opening, and one rib of each interlocking pair being formed in two parts, one part being rigid and the other being yieldingly supported.

4. The combination in a pipe coupling of two duplicate heads having lateral communicating openings, curved interlocking ribs carried by said heads, the said ribs being upon opposite sides of the opening and one rib of each interlocking pair being formed with its lower part rigid with the head and its upper part separate and spring supported.

5. The combination in a pipe coupling, of two duplicate heads having lateral communicating openings, two lateral semi-circular ribs upon each head arranged concentric with the openings, one rib upon each head being rigid and the other being rigid throughout part of its length, and being spring pressed laterally throughout the balance of its length.

6. The combination in a pipe coupling, of two coupling heads, interlocking ribs carried by said heads, one of said ribs formed rigid with the head for a short distance, the head being formed with a slot in line with the short rib and being provided with a chamber back of the slot, a metal piece mounted in said chamber having a portion projecting through said slot, and forming a continuation of said short rigid rib, and a spring bearing upon said piece.

7. The combination in a pipe coupling, of two coupling heads, interlocking ribs carried by said heads, one of said ribs formed rigid with the head for a short distance, the head being formed with a slot in line with the short rib and being provided with a chamber back of the slot, an angular metal piece slidably mounted in said chamber, a flange on said piece projecting through the slot and forming a flexible continuation of said short rigid rib, a cover plate for said chamber, and springs between said plate and slidable metal piece.

8. A coupling head having a lateral opening, a short lateral semi-circular locking rib on said head arranged concentric with said opening, and a depressible spring-supported continuation of said rib.

In testimony whereof I affix my signature in presence of two witnesses.

WALTER W. KILPATRICK.

Witnesses:
JOHN J. McCARTHY,
JOHN M. COIT.